United States Patent [19]

Hashimoto

[11] Patent Number: 4,831,646

[45] Date of Patent: May 16, 1989

[54] AUTOMATIC TELEPHONE ANSWERING DEVICE FOR AUTOMATICALLY SETTING STANDBY MODE

[75] Inventor: Kazuo Hashimoto, Tokyo, Japan

[73] Assignee: Hashimoto Corporation, Tokyo, Japan

[21] Appl. No.: 830,127

[22] Filed: Feb. 18, 1986

[30] Foreign Application Priority Data

Feb. 18, 1985 [JP] Japan .................................. 60-31706

[51] Int. Cl.$^4$ ........................................... H04M 1/65
[52] U.S. Cl. ..................................... 379/82; 379/70; 379/79
[58] Field of Search ...................... 379/68, 70, 73, 82; 369/69

[56] References Cited

U.S. PATENT DOCUMENTS 3,829,616 8/1974 Blouch .
4,117,272 9/1978 Ando .
4,196,311 4/1980 Hoven .
4,609,783 9/1986 Hashimoto .

FOREIGN PATENT DOCUMENTS 54-119902 9/1979 Japan ..................................... 360/69

OTHER PUBLICATIONS

Code-A-Phone ® Telephone Answering System Model 2530 with Total Remote Command Installation and Operating Booklet, p. 2, ©, 1983.

Primary Examiner—Alan Faber
Assistant Examiner—James E. Tomassini
Attorney, Agent, or Firm—Lowe, Price, Leblanc, Becker & Shur

[57] ABSTRACT

An automatic telephone answering device has a timer energized when the device is set in a mode other than an automatic standby mode. A time-out output from the timer upon elapse of a preset timer's time and an output corresponding to a ringing signal are supplied to an AND gate. The device is controlled to automatically make an engaging loop circuit in response to an output from the AND gate and works as a telephone answering device to answer a call.

5 Claims, 7 Drawing Sheets

AUTOMATIC TELEPHONE ANSWERING DEVICE FOR AUTOMATICALLY SETTING STANDBY MODE

BACKGROUND OF THE INVENTION

The present invention relates to an automatic telephone answering device for setting a special standby mode.

Some conventional automatic telephone answering devices are automatically set in a standby mode to allow automatic operation even when a user forgets to set the device in the automatic standby mode. If the user interrupts the play back operation during listening to incoming message tape and leaves the automatic telephone answering device as it is, the device is automatically set immediately in the above-mentioned standby mode. However upon reception of an incoming call at that time, the device makes to the play back mode and the recording mode sequentially, wherein an incoming message from a calling party can be recorded. Therefore, when the user returns to restart the incoming message tape to listen to remaining messages, the remaining message may have been erased already.

SUMMARY OF THE INVENTION

It is an object of the present invention to provide an automatic telephone answering device wherein even if the incoming message tape is manually played back and then stopped, the device is automatically set in the standby mode after a predetermined period of time has elapsed, or even if the incoming message tape is manually played back and then stopped at tape end or the like, this state is detected and the incoming message tape is rewound to the start point, and the device is automatically set in the standby mode after a predetermined period of time.

According to the present invention, there is provided an automatic telephone answering device with a timer operated in a mode other than the automatic standby mode, wherein the standby mode is automatically set after a timer's preset time. Technically speaking, a time-out output from the timer and a ringing signal from the calling party are supplied to an AND gate, and the automatic telephone answering device may be set in the engaging mode in response to an output from the AND gate.

A standby mode setting means of the present invention has the advantage that an output from a timer and a ringing signal upon reception of an incoming call are supplied to an AND gate, and the device is automatically set in the engaging mode in response to an output from the AND gate, thereby avoiding the inconvenience caused when the user forgets to turn on an automatic standby switch in a above conventional automatic telephone answering device.

BRIEF DESCRIPTION OF THE DRAWINGS

FIG. 6(a) is a schematic chart showing a signal recorded on a tape used in the fifth embodiment; and FIG. 6(b) is a schematic chart showing another signal recorded on a tape used in the fifth embodiment.

DETAILED DESCRIPTION OF THE PREFERRED EMBODIMENTS

The arrangements and operations of the preferred embodiments according to the present invention will be described in detail.

Figures 1, 1A:
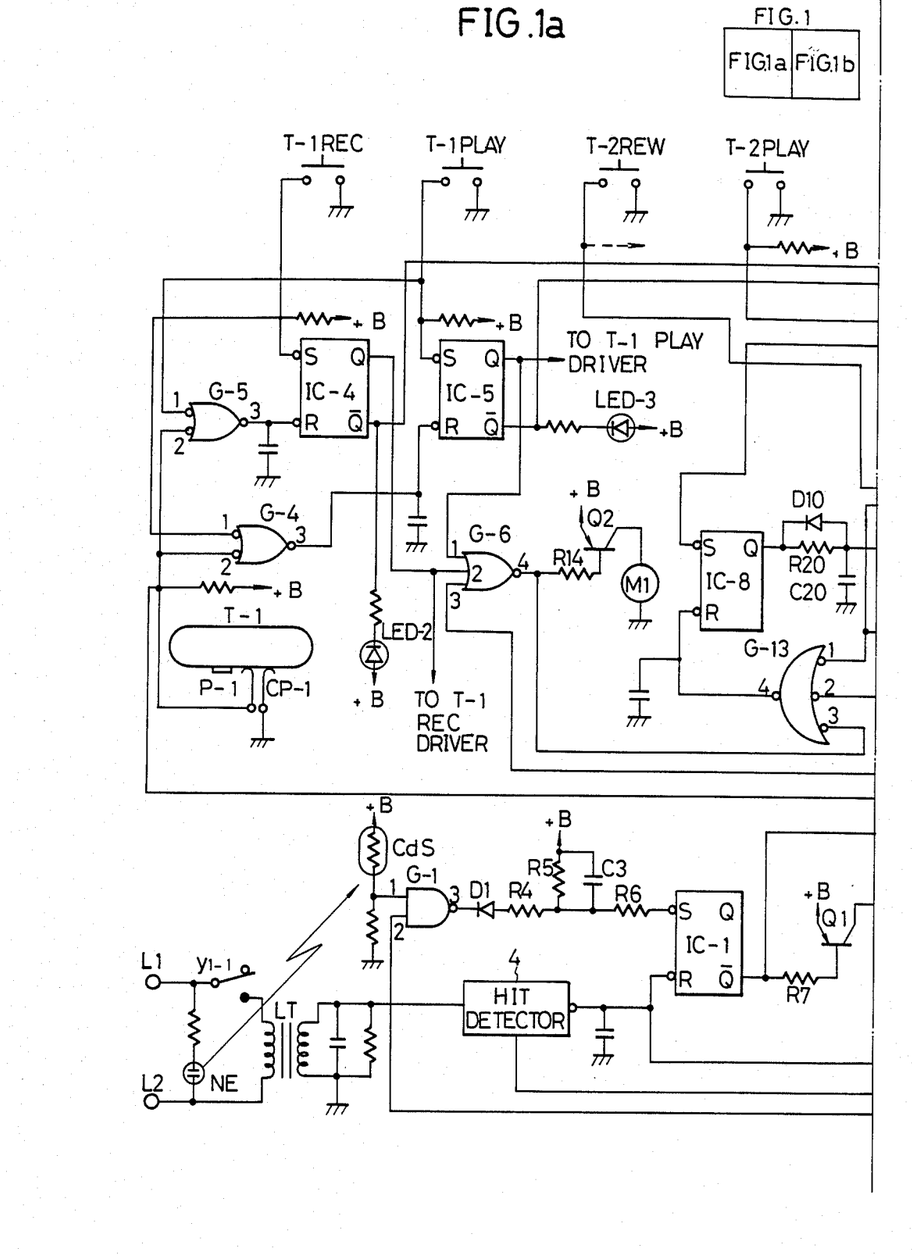
FIGS. 1(a) and 1(b) are a circuit diagram showing the overall arrangement of an automatic telephone answering device according to a first embodiment of the present invention.

Referring to FIG. 1, reference symbol T-1REC denotes a record button for recording an outgoing message on an endless outgoing message tape T-1; T-1PLAY, a play button for playing the outgoing message tape T-1; T-2REW, a rewind button for rewinding an incoming message tape T-2 (substantially the same as that in FIGS. 6(a) and 6(b)); T-2PLAY, a play button for playing the incoming message tape T-2, T-2FF, a fast forward button for fast-forwarding the incoming message; STOP, a stop button for stopping the incoming message tape; and AUTO, a button for manually setting the device in the automatic standby mode.

Figure 1B:
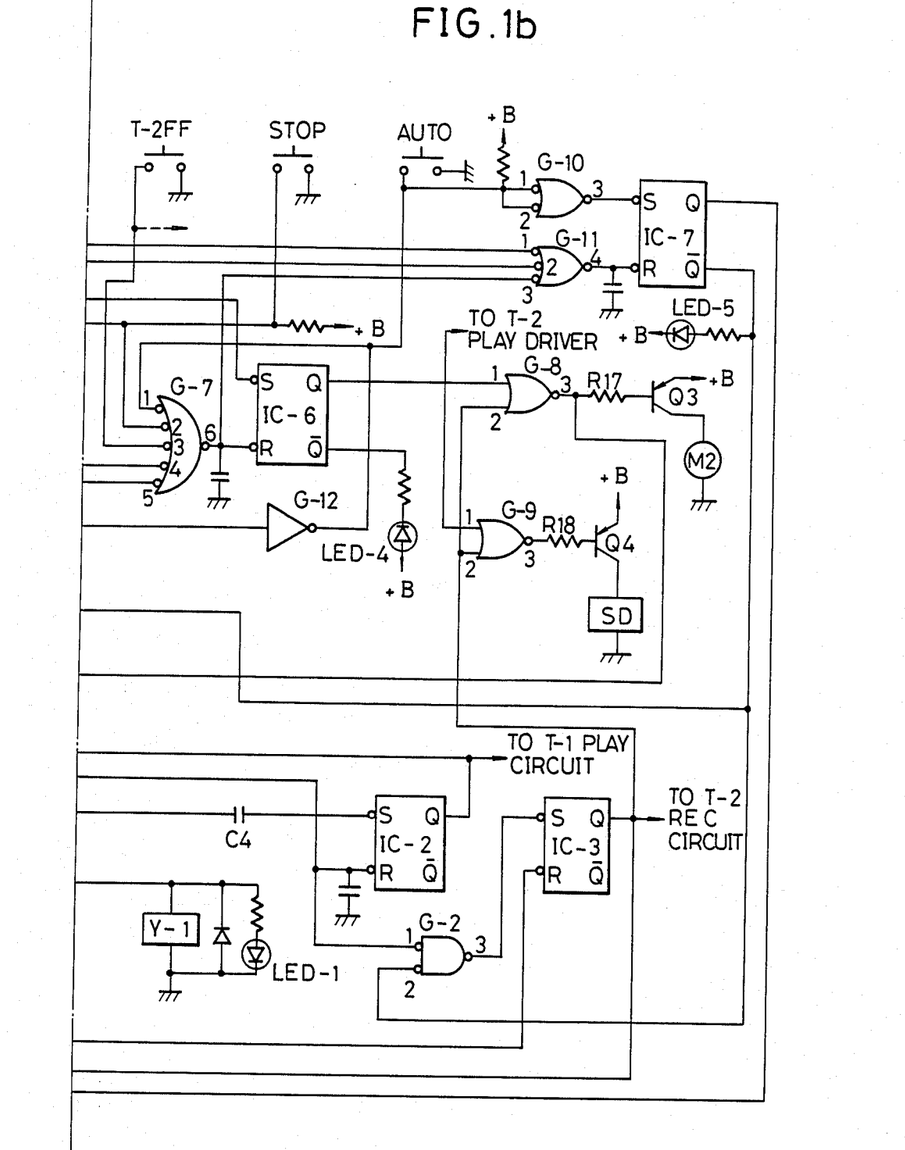

Reference symbol M1 denotes a motor for driving the outgoing message tape T-1 at normal speed; and M2, a drive motor for driving the incoming message tape T-2. An incoming message tape drive mechanism (not shown) includes the motor M2 and a solenoid SD. When the motor M2 and the solenoid SD are simultaneously operated, the incoming message tape T-2 is driven at normal speed in the forward direction. However, when only the motor M2 is driven, the incoming message tape T-2 is rewound. When the motor M2 is driven at high speed and at the same time the solenoid SD is operated, the incoming message tape T-2 is fast-forwarded. Reference symbols L1 and L2 denote telephone lines; and NE and CdS, a neon lamp and a photosensor, respectively. The neon lamp NE and the photosensor Cds constitute a photocoupler for detecting a ringing signal.

Reference symbol IC-1 denotes a flip-flop. While the button AUTO is depressed, the flip-flop IC-1 is set in response to the ringing signal. The flip-flop IC-1 is reset in response to an output from a hit detector 4 for detecting an on-hook pulse when the calling party hangs up the phone. Reference symbol Y-1 denotes a loop relay driven in response to an output from the flip-flop IC-1. The loop relay Y-1 has a contact y1-1. Reference symbol IC-2 denotes a flip-flop for driving the outgoing message tape T-1. The flip-flop IC-2 is set in response to the output from the flip-flop IC-1. Reference symbol IC-3 denotes a flip-flop for driving the incoming message tape T-2 in the record mode. The flip-flop IC-3 is set when the outgoing message tape T-1 is played by each cycle. Reference symbol IC-4 also denotes a flip-flop. The flip-flop IC-4 is set upon depression of the button T-1REC and then generates an output to drive the outgoing message tape T-1 in the record mode. When a tap P-1 attached to the start point of the outgoing message tape T-1 is brought into contact with an electrode CP-1, the flip-flop IC-4 is reset. Gates G-4 to G-6 cooperate with the flip-flops IC-4 and IC-5, the motor M1, a resistor R14 and a transistor Q2 to drive the outgoing message tape T-1. Reference symbol IC-5 denotes a flip-flop. The flip-flop IC-5 is set upon depression of the button T-1PLAY and then generates an output to drive the outgoing message tape T-1 in the play mode. However, when the tap P-1 is brought into contact with the electrode CP-1, the flip-flop IC-5 is reset. Reference numeral also IC-6 denotes a flip-flop. The flip-flop IC-6 is set upon depression of the bottom T-2PLAY and generates an output to drive the incoming message tape T-2 in the play mode. However, when another button is depressed the flip-flop IC-6 is reset through a NOR gate G-7. A flip-flop IC-7 is set upon depression of the button AUTO. An output from the flip-flop IC-7 enables an AND gate G-1 to set the automatic telephone answering device in the standby mode. When an incoming call is made while the device is in the standby mode, the outgoing message tape T-1 is driven and then the incoming message tape T-2 is driven to record a message from a calling party. When another button is depressed, the flip-flop IC-7 is reset in response to a signal through a gate G-11. A flip-flop IC-8 is set upon depression of the button STOP in the driving mode (play, rewind or fast forward) of the incoming message tape T-2. An output Q from the flip-flop IC-8 charges a capacitor C20 through a resister R20. When the capacitor C20 completes charging after, e.g., 10 minutes to 1 hour, the flip-flop IC-7 is set through an inverter G12, thereby setting the automatic telephone answering device in the standby mode. The flip-flop IC-8 is reset in response to the set output from the flip-flop IC-7 or upon depression of another button.

The automatic telephone answering apparatus also has a flip-flop set upon depression of the button T-2REW or T-2FF. However, this flip-flop is similar to the flip-flop IC-6, set upon depression of the button T-2PLAY, and is omitted herein. Reference symbol +B denotes a DC voltage source; L, a line transformer; and LED1 to LED5, light-emitting diodes for indicating the operating modes.

The operation of the automatic telephone answering apparatus according to the first embodiment will be described hereinafter.

Assume that incoming messages have already been recorded on the incoming message tape, and that the user or owner of the telephone answering apparatus has just returned home. He depresses the button T-2REW to rewind the incoming message tape T-2. He then depresses the button T-2PLAY. In this state, a set terminal S of the flip-flop IC-6 goes low, so that the flip-flop IC-6 is set and the terminal Q of the flip-flop IC-6 thereof goes high. The motor M2 is driven through a NOR gate G-8, a resistor R17, and a transistor Q3. At the same time, the solenoid SD is energized through a NR gate G-9, a resistor R18, and a transistor Q4. As a result, the incoming message tape T-2 is driven at normal speed in the play mode.

An audio circuit is not illustrated in FIG. 1 since it is known to those skilled in the art. Assume that the owner finishes listening to the incoming messages recorded on the incoming message tape T-2 and depresses the button STOP because he must leave the automatic telephone answering device. The flip-flop IC-6 is reset through terminals 2 and 6 of the OR gate G-7. As is apparent from the above description, the incoming message tape T-2 is stopped. As soon as the user depresses the button STOP, the flip-flop IC-8 is set and the terminal Q of the flip-flop IC-8 goes high. Charging of the capacitor C20 is started through the resistor R20. When the capacitor C20 completes charging after, for example, about 10 minutes to 1 hour, the flip-flop IC-7 is reset through the inverter G-12 and an OR gate G-10. The terminal Q of the flip-flop IC-7 goes high, thereby enabling the NAND gate G-1. Therefore, the automatic telephone answering device is set in the standby mode for receiving the next incoming call (to be described later).

However, when the owner returns to the automatic telephone answering device within 10 minutes to 1 hour after depression of the button STOP and depresses the button T-2PLAY to listen to the interrupted incoming message tape T-2, the fip-flop IC-6 is set as described above. The terminal Q of the flip-flip IC-6 goes high. The flip-flop IC-8 is reset through terminals 1 and 3 of the NOR gate G-8 and terminals 2 and 4 of the OR gate G-13. The terminal Q of the flip-flop IC-8 goes low, and the capacitor C20 is rapidly discharged through a diode D10. The flip-flop IC-7 is not set, and the incoming message tape T-2 is set in the play mode. Therefore, the owner can listen to the remaining messages recorded on the incoming message tape T-2. When the owner finishes listening to all messages recorded on the incoming message tape T-2, he depresses the button STOP, and the incoming message tape is stopped. When the automatic telephone answering device is left in this state, the STOP, the automatic telephone answering device is not 10 minutes to 1 hour. However, when the owner wishes to set the automatic telephone answering device in the standby mode immediately, he depresses the button AUTO. The flip-flop IC-7 is set directly, and the automatic telephone answering device is set in the standby mode in response to an output from the flip-flop IC-7.

When a ringing signal is received by the automatic telephone answering device in the standby mode, the ringing signal is detected by the photocoupler, consisting of the neon lamp NE and the photosensor CdS, to set a terminal 1 of the AND gate G-1 at high level. A terminal 2 of the AND gate G-1 goes high in response to the output from the flip-flop IC-7. Whenever the ringing signal is received, a terminal 3 of the NAND gate G-1 goes low to charge through a diode D1 and a resistor R4 the capacitor C3 connected in parallel with the power source +B. After a few ringing tones are generated, the flip-flop IC-1 having a terminal S connected to the capacitor C3 through a resistor R6 is set. An output from the flip-flop IC-1 is supplied to a transistor Q1 through a resistor R7. The transistor Q1 is turned on, and the loop relay Y-1 is energized. As a result, a loop is formed through the contact y1-1 of the loop relay Y-1, and the ringing tones are thus stopped.

As soon as the flip-flop IC-1 is set, a pulse is generated by a capacitor C4 to set the flip-flop IC-2. An output from the flip-flop IC-2 drives the outgoing message tape T-1. An outgoing message is sent to a calling party through a known audio circuit (not shown). Thereafter, when the outgoing message tape T-1 is driven by one cycle and the tab P-1 is brought into contact with the electrode CP-1, the flip-flop IC-2 is reset and the outgoing message tape T-1 is stopped. At the same time, the flip-flop IC-3 is set through an AND gate G-2. An output from the flip-flop IC-3 drives the incoming message tape T-2 in the record mode to record an incoming message from the calling party. When the calling party hangs up the phone after he has recorded his message on the coming message tape, an on-hook signal is detected by the hit detector 4. An output from the hit detector 4 resets the flip-flops IC-1 and IC-3. Therefore, the automatic telephone answering device is set in the standby mode. The above operation is repeated to accumulate incoming messages on the incoming message tape T-2.

A second embodiment of the present invention will be described with reference to FIG. 2. In the device in FIG. 1, the automatic telephone answering device is unconditionally set in the standby mode within 10 minutes to 1 hour upon depression of the button STOP. However, if the tape is almost used and there is only little blank interval for several minutes (before tape end), only one or two messages can be recorded voer the automatic telephone answering device is set in the standby mode. Thus, when the tape is almost at its end when the user depresses the button STOP, the automatic telephone answering device is not set to the standby mode. The end or near-end of the tape is indicated by an indicating means.

Figure 2:
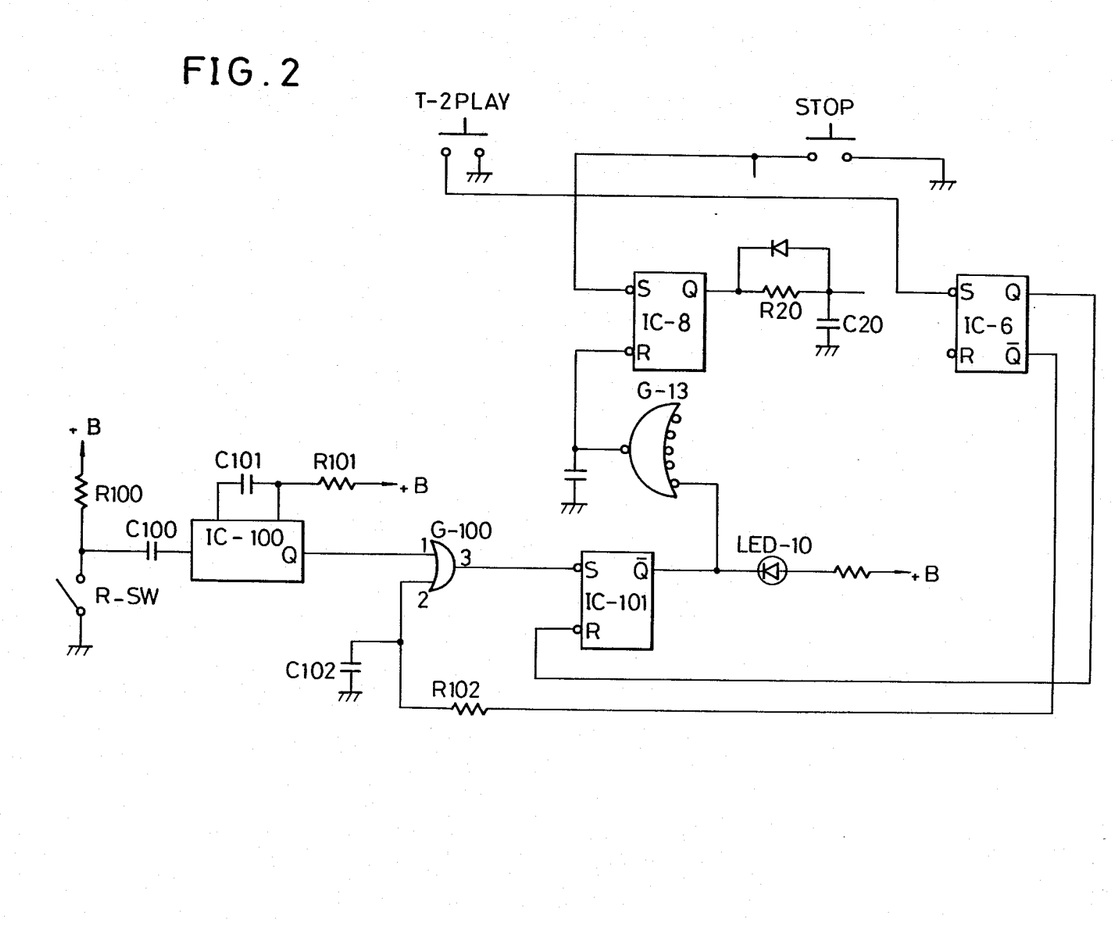
FIG. 2 is a circuit diagram showing the main part of an automatic telephone answering device according to a second embodiment of the present invention.

The device whose main part is shown in FIG. 2 is obtained by adding the above function to the device of FIG. 1. The same reference symbols and numerals in FIG. 2 denote the same parts as in FIG. 1, and identical parts are omitted in the same manner as in FIGS. 3 to 5 to be described later.

Referring to FIG. 2, reference symbol R-SW denotes a rotary switch interlocked with a take-up reel table (not shown) of an incoming message tape T-2; and IC-100, a retriggerable monostable multivibrator connected to a power source +B through a resistor R100 and a capacitor C100. The retriggerable monostable multivibrator IC-100 generates a pulse with a predetermined width when the rotary switch R-SW is turned on. By properly selecting a time constant determined by the capacitance of a capacitor C101 and the resistance of a resistor R101, an output Q from the monostable multivibrator IC-100 is kept high while the incoming message tape is being driven, but goes low when the incoming message tape reaches its end. When the tape nearly reaches its end, the output Q is alternatingly set at a high and low levels. In this case, the end or near-end of the tape is detected in accordance with the time constant determined by the capacitor C101 and the resistor R101. Reference symbol IC-101 denotes a flip-flop which is set when the tape reaches or approaches its end; and LED-10, a light-emitting diode operated in response to an output from the flip-flop IC-101 to indicate that the tape has reached or is approaching its end.

The operation of the automatic telephone answering device having the arrangement described above will now be described. When the owner depresses a button T-2PLAY, a flip-flop IC-6 in FIG. 2 is set. Prior to setting of the flip-flop IC-6, an output Q from the flip-flop IC-6 resets the flip-flop IC-101. A capacitor C102 is charged through a resistor R102 in response to an output Q from the flip-flop IC-6. A set terminal S of the flip-flop IC-101 is held high through terminals 1 and 3 of an OR gate G-100. The flip-flop IC-101 is not set. As described above, when the owner depresses the button T-2PLAY to drive the incoming message tape T-2 at normal speed, as described with reference to FIG. 1, the rotary switch R-SW interlocked with the take-up reel table (not shown) repeats the ON/OFF operation upon rotation of the reel table. Upon repetition of the ON/OFF operation of the rotary switch R-SW, the retriggerable monostable multivibrator IC-100 is triggered. The output Q from the monostable multivibrator IC-100 is set at high until the incoming message tape reaches or approaches its end. A terminal 1 of the OR gate G-100 goes high. The capacitor C102 connected to a terminal 2 of the OR gate G-100 discharges within about 2 seconds. As is apparent from the above description, the set terminal S of the flip-flop IC-101 is held high and the flip-flop IC-101 is not set. However, when the incoming message tape reaches its end and the rotary switch R-SW is held in the ON or OFF state, the output Q from the monostable multivibrator IC-100 goes low within about 1 second (a time constant of C101 x R101 is 1 second upon detection of the tape end in this embodiment). The set terminal S of the flip-flop IC-101 is set at low level through terminals 1 and 3 of the OR gate G-100. Therefore, a terminal Q of the flip-flop 101 goes low. The light-emitting diode LED-10 is turned on. At the same time, a flip-flop IC-8 set upon depression of the button STOP is reset in response to an output Q of the flip-flop IC-101. In this state, even if the owner depresses the button STOP to stop driving the incoming message tape T-2, unlike in the case of FIG. 1, the flip-flop IC-8 is not set. Furthermore, even if a predetermined period of time (10 minutes to 1 hour) has elapsed, the automatic telephone answering device in FIG. 2 is not set in the standby mode.

Detection of near-end of the incoming message tape will be described. In this embodiment, a time constant (C101×R101) of a time constant circuit consisting of the capacitor C101 and the resistor R101 in the retriggerable monostable multivibrator is set to be 0.5 second. When the incoming message tape approaches its end, the rotational speed of the take-up reel table is decreased. When an ON/OFF cycle of the rotary switch R-SW interlocked with the reel table exceeds 0.5 second or more, the monostable multivibrator IC-100 becomes retriggerable. The output Q from the monostable multivibrator IC-100 is changed from H level to a repetition of the L and H levels until the incoming message tape reaches its end. When the output Q from the monostable multivibrator IC-100 goes low, the flip-flop IC-101 is set as in the case wherein the incoming message tape reaches its end. The light-emitting diode LED-10 is turned on, and the flip-flop IC-8 is held reset through the OR gate G-13. Even if the owner depresses the button STOP to stop the incoming message tape T-2, the flip-flop IC-8 is not set. When the predetermined period of time has elapsed, the automatic telephone answering device is not set in the standby mod.

A main part of a third embodiment will be described with reference to FIG. 3. When the incoming message tape (not shown) is stopped upon depression of the button STOP in the device of FIG. 1, the device is automatically set in the standby mode within a predetermined period of time (e.g., 10 minutes to 1 hour). Upon reception of the subsequent incoming call, the automatic telephone answering device is normally operated. However, in the automatic telephone answering device in FIG. 3, when the incoming message tape is stopped upon depression of the button STOP, an ANDed output of the output of the timer after a predetermined period of time (e.g., 10 minutes to 1 hour) and the first ringing signal sets the automatic telephone answering device in the stand-by mode. More specifically, after a predetermined number of ringing signals are received, the device is normally operated.

Figure 3:
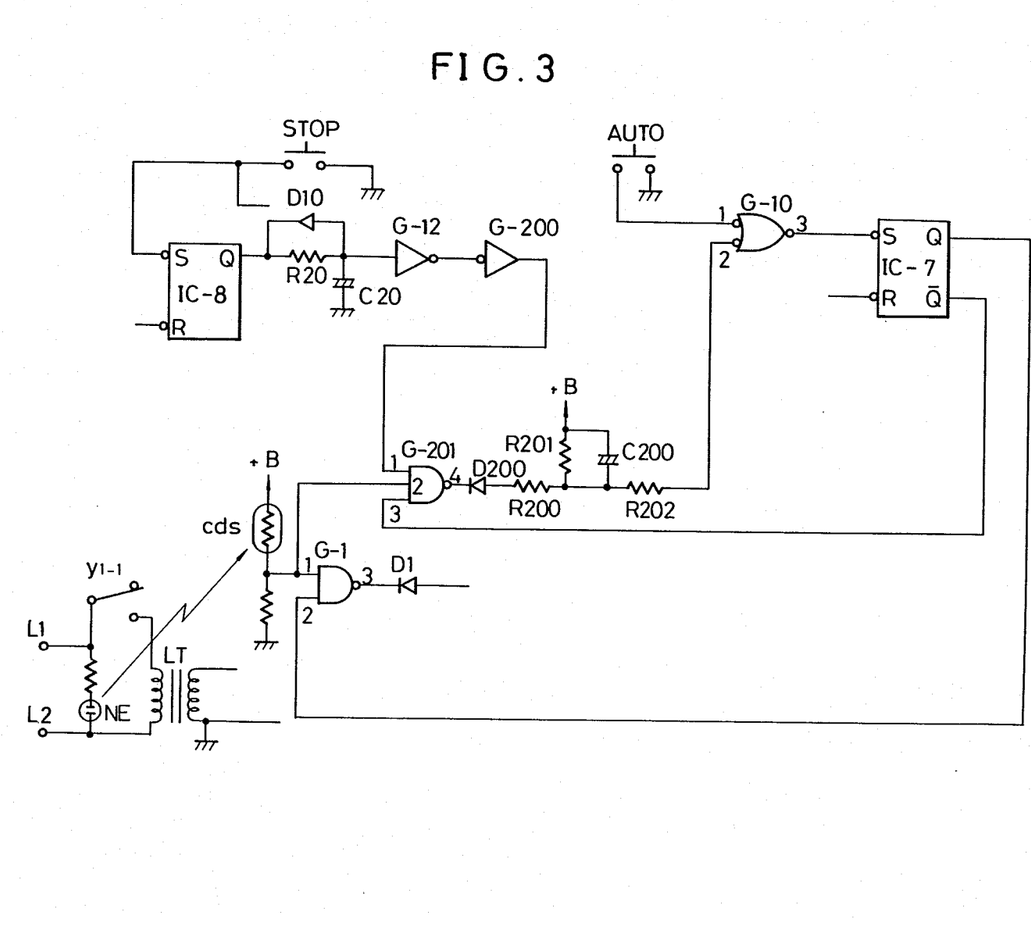
FIG. 3 is a circuit diagram showing the main part of an automatic telephone answering device according to a third embodiment of the present invention.

Referring to FIG. 3, parts represented by 200s are arranged for only the automatic telephone answering device according to the third embodiment. Only the detailed operation will be described. In the same manner as described above, a flip-flop IC-8 is set upon depression of a button STOP while the incoming message tape is being driven. When a predetermined period of time corresponding to a time constant R20 x C20 (e.g., 10 minutes to 1 hour) has elapsed, a terminal 1 of an AND gate G201 goes high through inverters G-12 and G-200. A terminal 2 of the AND gate G-201 is connected to one terminal of a ringing signal detection photosensor CdS and is held low. A terminal 3 of the AND gate G-201 is connected to a terminal Q of a flip-flop IC-7 and is set at H level when it is not set yet in the standby mode. In this state, when a ringing signal appears on telephone lines L1 and L2, a neon lamp NE is turned on. Light from the lamp NE is incident on the photosensor CdS, and an internal resistance of the photosensor CdS is decreased to set the terminal 2 of the NAND gate -201 at H level. As is apparent from the above description, a terminal 4 of the NAND gate G-201 goes low. A capacitor C200 connected to the power source +B in series with the resistor R201 is charged through a diode D200 and a resistor R200. When the first ringing tone is stopped, a terminal 2 of an OR gate G-10 connected to the capacitor C200 through a resistor R202 goes low. A flip-flop IC-7 is set and an AND gate G-1 is enabled in the same manner as described with reference to FIG. 1. The automatic telephone answering device is set in the standby mode. Therefore, the subsequent ringing signal is put through the NAND gate G-1 and the diode D1, so that the automatic telephone answering device is normally operated.

Figures 4, 6:
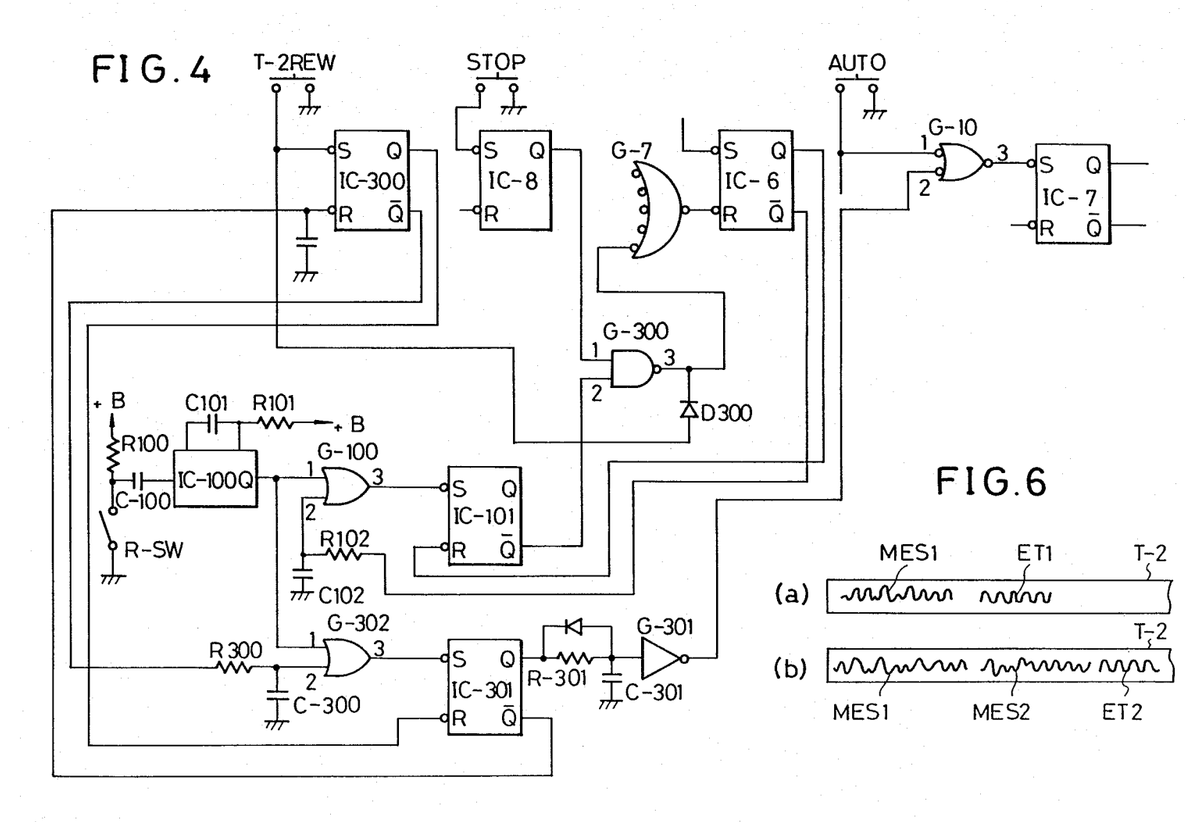
FIG. 4 is a circuit diagram showing the main part of an automatic answering device according to a fourth embodiment of the present invention.

A main part of a fourth embodiment will be described in detail with reference to FIG. 4. In the arrangement of FIG. 4, when the owner depresses a button STOP while an incoming message tape T-2 is being driven and if the incoming message tape T-2 reaches or approaches its end, the incoming message tape is rewound to the start point. When a predetermined period of time (e.g., 10 minutes to 1 hour) has elapsed, the automatic telephone answering device is automatically set in the standby mode.

Referring to FIG. 4, parts represented by 300s are arranged for only the device of the fourth embodiment. The operation of these parts will be described in detail together with the associated parts. When the incoming message tape T-2 reaches or approaches its end while the incoming message tape T-2 is driven, a flip-flop IC-101 is set through a rotary switch R-SW, a monostable multivibrator IC-100 and an OR gate G-100. When the flip-flop IC-101 is set, a terminal 2 of an NAND gate G-300 goes high. In this state, when the owner depresses the button STOP, a flip-flop IC-108 is set, and a terminal 1 of the NAND gate G-300 goes high. A play back flip-flop IC-6 is reset through a terminal 3 of the NAND gate G-300 to stop driving the incoming message tape. At the same time, a rewind flip-flop IC-300 is set through a diode D300. A rewind circuit is not shown in FIGS. 4 and 1 but is controlled by the flip-flop IC-300. An L level signal appearing at a terminal Q of the flip-flop IC-300 is supplied to a terminal S of the flip-flop IC-301 through a resistor R300, a capacitor C300 and an OR gate G-302, so that the reset state of the flip-flop IC-301 is cancelled. The flip-flop IC-301 is set when the incoming message tape T-2 is completely rewound. When rewinding is started, the rotary switch R-SW interlocked with the reel table repeats ON/OFF operation to trigger the monostable multivibrator IC-100. Since terminals 1 and 3 of the OR gate G-302 are held high, then the flip-flop IC-301 is not set. However, when the incoming message tape T-2 is rewound to the start point and the ON/OFF operation of the rotary switch R-SW is stopped, the output Q from the monostable multivibrator IC-100 goes low and sets the flip-flop IC-301 through the OR gate G-302. As is apparent from FIG. 4, upon setting of the flip-flop IC-301, the rewind flip-flop IC-300 is reset. At the same time, the capacitor C301 is charged by the H level output Q from the flip-flop IC-301 through a resistor R301. In the same manner as previously described, when a predetermined period of time (e.g., 10 minutes to 1 hour) has elapsed, the flip-flop IC-7 is set through an inverter G-301 and on OR gate G-10. As a result, the automatic telephone answering device can be set in the standby mode.

Figure 5A:
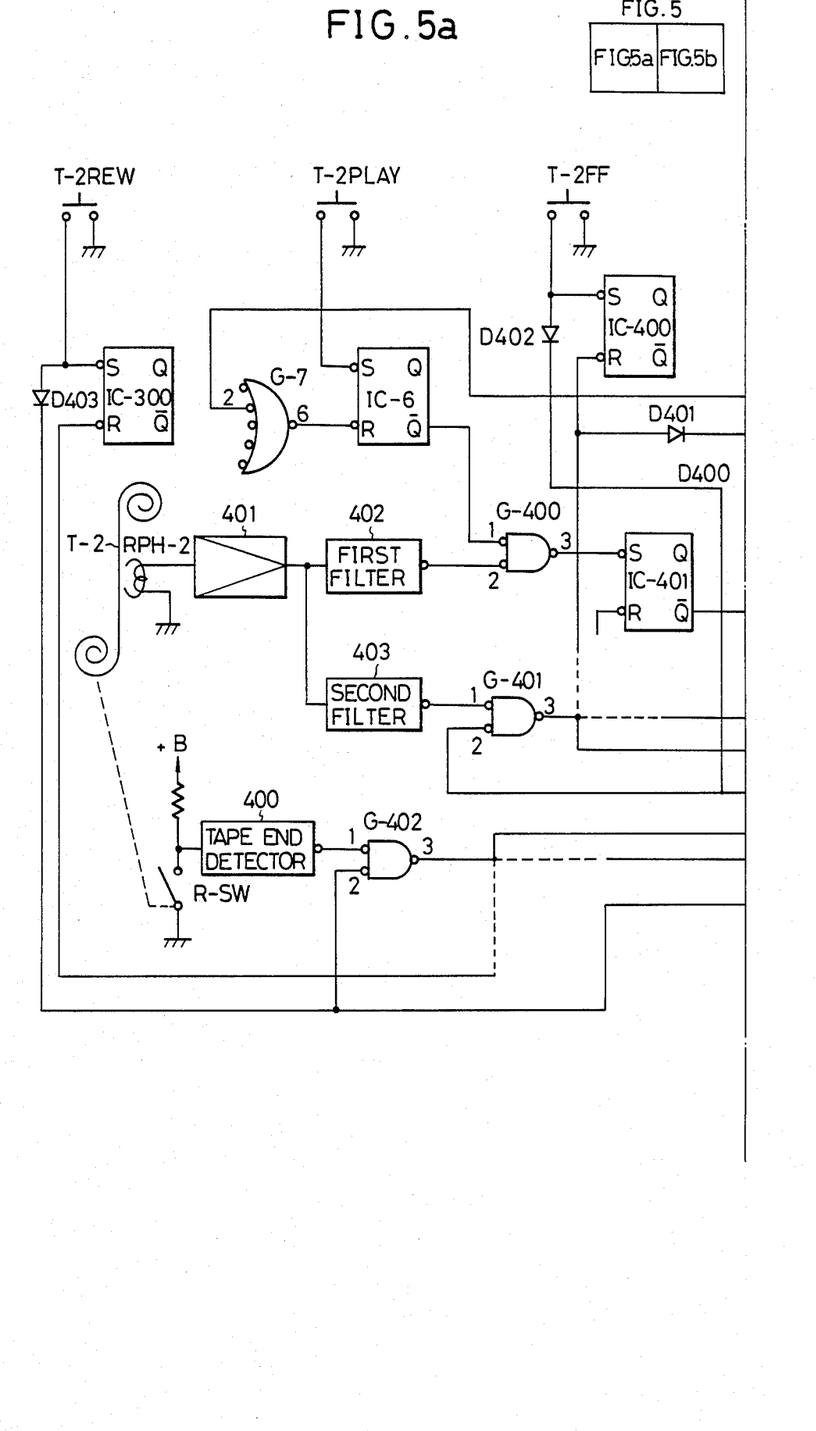
FIGS. 5(a) and 5(b) are a circuit diagram showing the main part of an automatic telephone answering device according to a fifth embodiment of the present invention.
Figure 5B:
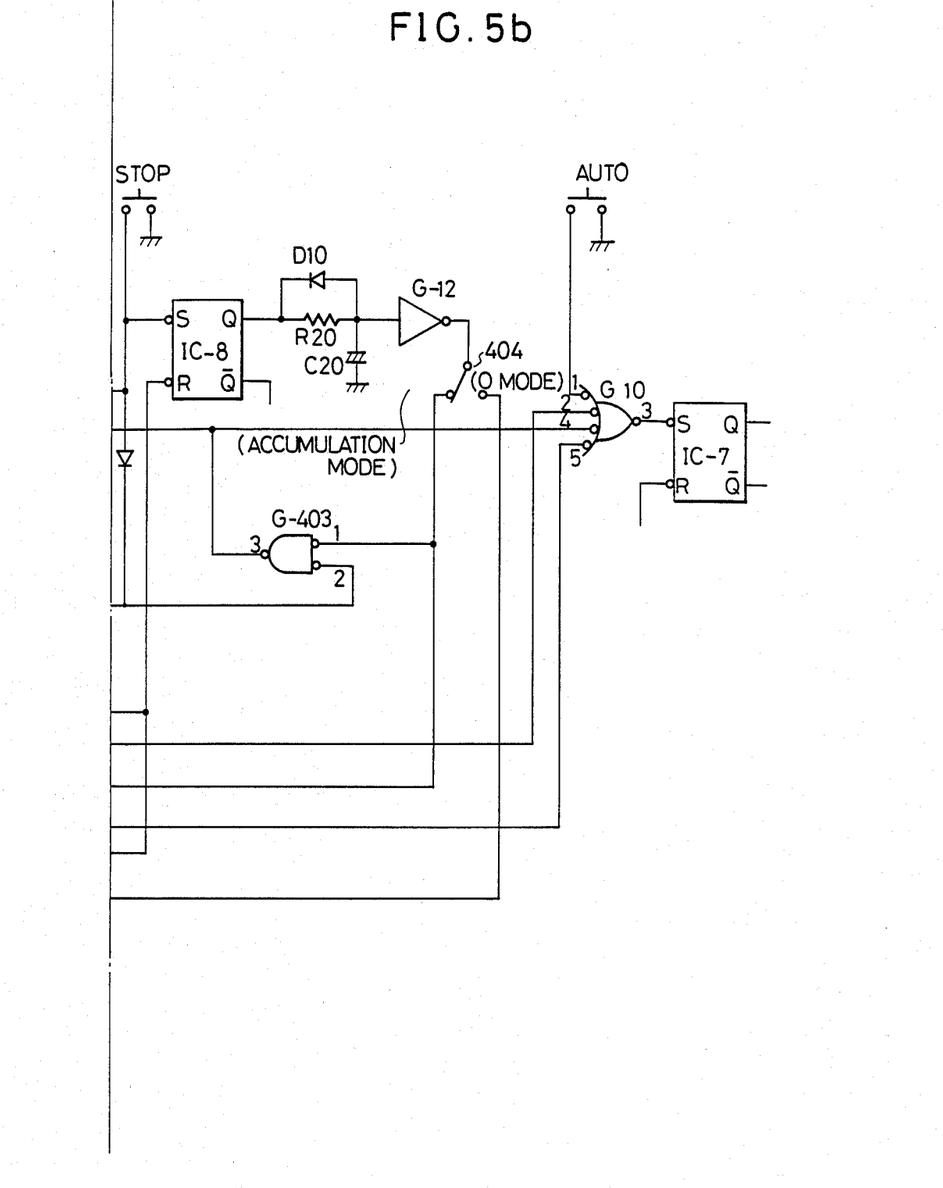

A main part of a fifth embodiment will be described with reference to FIG. 5. In the embodiment of FIG. 5, when all incoming messages are played from the incoming message tape T-2 (FIG. 6(a) or 6(b)), the incoming message tape T-2 is automatically stopped. When a predetermined period of time (e.g., 10 minutes to 1 hour) has elapsed, the owner can select a "0 mode" (the incoming message tape T-2 is rewound to the start point and is held at the start point) or an "accumulation mode" (the incoming message tape T2 is stopped at the end of the last incoming message). In the "accumulation mode", when the owner depresses the button STOP before the incoming message tape T-2 reaches its last message, he can fast forward the incoming message tape T-2 to the end of the message, so that the incoming message tape T-2 is set in this stop position.

Referring to FIG. 5, parts represented by 400s are arranged for the device of a fifth embodiment. Reference symbol IC-400 denotes a flip-flop for supplying an output Q to an incoming message tape drive mechanism (not shown) to fast forward the incoming message tape; IC-401, a flip-flop set in response to an end tone recorded at the end of the message; and G-400, G-401 and G-402, AND gates respectively. Reference numeral 400 denotes an end point (start point detector as a block of the IC-100 and IC-101 as in FIG. 2. Reference numeral 401 denotes an amplifier for the incoming message tape T-2. Reference symbol RPH-2 denotes a record/play head. Reference numeral 402 denotes a first filter for detecting the end tone in the play back mode of the incoming message tape T-2; 403, a second filter for detecting the end tone of the incoming message tape in the fast forward mode; and 404, a selection switch for selecting the "0 mode" or the "accumulation mode".

The operation of the automatic telephone answering device according to the fifth embodiment will be described in detail. An end tone is prerecorded in the incoming message tape T-2, as shown in FIG. 6(a) or 6(b). As shown in FIG. 6(a), reference symbol MES1 is a first incoming message recorded by a calling party, and an end tone ET1 is recorded after the incoming message MES1. As shown in FIG. 6(b), the end tone ET1 is instantaneously rewound, a second incoming message MES2 is recorded in a portion succeeding the end tone ET1, and an end tone ET2 is recorded after the second incoming message MES2. This operation is repeated to accumulate a large number of incoming messages. An end tone is recorded at the end of the last incoming message.

When the recorded incoming message tape is rewound and then played, a flip-flop IC-6 is set. An output Q from the flip-flop IC-6 enables an AND gate G-400. The message and end tone recorded on the incoming message tape T-2 can be reproduced with the record/play head RPH-2. The reproduced message and end tone are amplified by the amplifier 401. A loudspeaker which is not directly associated with the present invention is not shown since it is apparent to those skilled in the art. An output from the amplifier 401 is supplied to the first and second filters 402 and 403. When all incoming messages are played back from the incoming message tape T-2 and the owner listens to the end tone recorded after the last incoming message, the end tone is detected by the first filter 402 and sets a terminal 2 of a NAND gate G-400 at L level. Since the terminal 1 of the NAND gate G-400 is already set at L level, a terminal 3 of G-400 thereof is set at L level, thereby setting the flip-flop IC-401. Upon setting of the flip-flop IC-401, the STOP flip-flop IC-8 is set and the play back flip-flop IC-6 is reset through a diode D400. As is omitted in FIG. 5, resetting of the flip-flop IC-6 causes the incoming message tape T-2 to stop. Resetting of the flip-flop IC-8 causes a capacitor C20 to charge through a resistor R20, as previously described. When the selection switch 404 is set in the "accumulation mode" position (FIG. 5) after a predetermined period of time (e.g., 10 minutes to 1 hour), an AND gate G-403 is enabled in response to an output through an inverter G-12 and an output from the flip-flop IC401. Therefore, the flip-flop IC-7 is set through terminals 4 and 3 of an OR gate G10, and the automatic telephone answering device is set in the standby mode in response to an output from IC-7.

However, when the selection switch 404 is switched to the "O mode" position, a rewind flip-flop IC-300 is set through a diode 403 in response to the output from the inverter G-12. The incoming message tape T-2 is rewound by a rewind circuit (not shown). In the "0 mode", the AND gate G-402 is enabled in response to the output (L level) from the inverter G-12, so that the incoming message tape T-2 is rewound to the start point, and the end point (start point) detector 400 generates an L level signal. The flip-flop IC-7 is set through the AND gate G-402 and terminals 5 and 3 of the OR gate G-10, thereby setting the automatic telephone answering device in the standby mode. The rewind flip-flop IC-300 is reset in response to the output from the AND gate G-402, thereby cancelling the rewind mode. In practice, a gate IC is inserted in a portion indicated by broken lines in FIG. 5 but is not illustrated in FIG. 5.

An operation will be described wherein the selection switch 404 is set in the "accumulation mode" position and the owner depresses the button STOP before the incoming message tape T-2 reaches the end. When the button STOP is depressed in the play back mode of the incoming message tape T-2, the flip-flop IC-8 is directly set. When a predetermined period of time (e.g., 10 minutes to 1 hour) has elapsed, in response to the output from the flip-flop IC-8, a fast forward flip-flop IC-400 is set through the inverter G-12, the selection switch 404 and the diode D402 (in this case, the end tone is not detected, IC-401 is not set, but the AND gate G-403 is enabled not to reset the AND gate G-400 through the diode D401). The incoming message tape T-2 is fast forwarded (not shown). During fast forwarding, the AND gate G-401 is enabled in response to the output from the inverter G-12. During fast forwarding, a 20-Hz end tone (20 Hz is superposed on 1,400 Hz in this embodiment) is reproduced at a frequency corresponding to an FF speed. When the reproduced end tone is detected by the second filter 403, the flip-flop IC-7 is set through the AND gate G-401 and the terminals 2 and 3 of the OR gate G-10, thereby setting the automatic telephone answering device in the standby mode. In this case, the fast forward flip-flop IC-400 is reset in response to an output from the AND gate G-401 to stop fast forwarding.

According to the present invention as described above, when the owner forgets to set the automatic telephone answering device in the standby mode, a predetermined period of time is automatically counted by a timer. Only when another trigger signal such as a ringing signal is externally supplied in the predetermined period of time, the AND gate is enabled to set the automatic telephone answering device in the standby mode. The present invention is exemplified by the automatic telephone answering device, but can also be applied to any automatic electric appliance. In the automatic telephone answering device using an incoming message tape, when the incoming message tape reaches or approaches its end, the timer is rendered inoperative or the tape is rewound to its start point and the automatic telephone answering device is set in the standby mode after a predetermined period of time. The present invention provides a variety of applications.

What is claimed is:

1. An automatic telephone answering device having means for engaging telephone lines in response to an incoming call, an incoming message storage medium for recording incoming messages, an outgoing message storage medium for storing a prerecorded outgoing message, and means operative in a standby mode for controlling said device in response to an incoming call to reproduce on the lines to a caller an outgoing message prerecorded on said outgoing message storage medium and then to record onto said coming message storage medium an incoming message from said caller, and a manual stop control to place said device in a "stop" mode, the device comprising:
   means for detecting operation of the manual stop control;
   timer means responsive to said operation detecting means for generating a timer signal indicating that at least a predetermined time has elapsed since the stop control was manually operated;
   means for detecting an incoming ringing signal on the lines;
   logic means responsive to said timer means and said detecting means for generating a control signal when an incoming ringing signal is received after said predetermined time has elapsed; and
   means responsive to said control signal for placing said device in said standby mode.

2. The device of claim 1, including first means for detecting when said incoming recording medium is nearly full with recorded incoming message, and in response, inhibiting said standby mode placing means.

3. The device of claim 2, further including second means for detecting when said device is in any mode other than said standby mode, and means responsive to said control signal and to said first and second detecting means for immediately rewinding said incoming recording medium to a start point and then placing said device in said standby mode.

4. The device of claim 3, including third means responsive to said timer means and said manual "stop" control for detecting when said device is placed in the "stop" mode after the incoming message recording medium is driven following reproduction of a last incoming message for immediately rewinding said incoming message medium to an end point of said last message and then placing said device in said standby mode, following said elapsed time.

5. The device of claim 1, wherein said timer means is variable.

* * * * *